United States Patent
Yaghmour (10) Patent No.: US 11,163,460 B2
(45) Date of Patent: Nov. 2, 2021

(54) DYNAMICALLY-RECONFIGURABLE STORAGE DEVICE

(71) Applicant: Karim Jean Yaghmour, Sherbrooke (CA)

(72) Inventor: Karim Jean Yaghmour, Sherbrooke (CA)

( * ) Notice: Subject to any disclaimer, the term of this patent is extended or adjusted under 35 U.S.C. 154(b) by 0 days.

(21) Appl. No.: 16/435,127

(22) Filed: Jun. 7, 2019

(65) Prior Publication Data

US 2019/0377505 A1 Dec. 12, 2019

Related U.S. Application Data (60) Provisional application No. 62/682,024, filed on Jun. 7, 2018.

(51) Int. Cl.
*G06F 3/06* (2006.01)
*G06F 1/16* (2006.01)

(52) U.S. Cl.
CPC ............ *G06F 3/0629* (2013.01); *G06F 1/163* (2013.01); *G06F 3/0604* (2013.01); *G06F 3/067* (2013.01); *G06F 3/0664* (2013.01)

(58) Field of Classification Search
CPC ........ G06F 3/067; G06F 1/163; G06F 3/0604; G06F 3/0607; G06F 3/0629; G06F 3/0661; G06F 3/0664

(Continued)

(56) References Cited

U.S. PATENT DOCUMENTS 9,411,528 B1\* 8/2016 McGarry .............. G06F 3/0665
2006/0075278 A1\* 4/2006 Kallahalla ............. G06F 3/0683
714/4.1

(Continued)

OTHER PUBLICATIONS

Wikipedia, priority date "Virtualization" https://en.wikipedia.org/wiki/Virtualization, last version of record as published as of the of Jun. 7, 2018, as retrieved on Aug. 27, 2021, 4 pages.

(Continued)

*Primary Examiner* — Hashem Farrokh (57) ABSTRACT

The present disclosure provides several embodiments of a dynamically-reconfigurable storage device. A primary feature of a dynamically-reconfigurable storage device is that it appears to a data store accessing device, such as a PC, as if it were an actual data store, say a USB thumb drive, whereas in reality the dynamically-reconfigurable storage device hosts several virtual data stores, each of which may be dynamically selectable to be made individually visible to the connected data store accessing device each as a separate actual data store. As such, a single dynamically-reconfigurable storage device is configurable to store what may appear, for example, as several individual USB thumb drives whereas said dynamically-reconfigurable storage device uses a single SD card to store all those virtual USB thumb drives. When a data store accessing device, such as a PC, is connected to the dynamically-reconfigurable storage device, a data store access configurator, possibly an app on a smartphone, is contacted to obtain a data access configuration, thereby enabling a user to dynamically select which virtual data store is made visible to the data store accessing device as an actual data store.

16 Claims, 5 Drawing Sheets

(58) Field of Classification Search
USPC .......................................................... 711/170
See application file for complete search history.

(56) References Cited

U.S. PATENT DOCUMENTS

| | | | | |
|---|---|---|---|---|
| 2013/0086352 | A1* | 4/2013 | Annepu | G06F 3/0631 711/170 |
| 2013/0297905 | A1* | 11/2013 | Yang | G06F 3/0632 711/165 |
| 2017/0293428 | A1* | 10/2017 | Radovanovic | G06F 12/0806 |
| 2019/0146696 | A1* | 5/2019 | d'Abreu | G06F 3/0664 711/154 |

OTHER PUBLICATIONS

Wikipedia, published as "Hardware virtualization" https://en.wikipedia.org/wiki/Hardware_virtualization, last version of record as of the priority date of Jun. 7, 2018, as retrieved on Aug. 27, 2021, 4 pages.
Wikipedia, published as "Desktop virtualization" https://en.wikipedia.org/wiki/Desktop_virtualization, last version of record as of the priority date of Jun. 7, 2018, as retrieved on Aug. 27, 2021, 3 pages.
Wikipedia, published as "OS-level virtualization" https://en.wikipedia.org/wiki/OS-level_virtualization, last version of record as of the priority date of Jun. 7, 2018, as retrieved on Aug. 27, 2021, 5 pages.
Wikipedia, published as "Application virtualization" https://en.wikipedia.org/wiki/Application_virtualization, last version of record as of the priority date of Jun. 7, 2018, as retrieved on Aug. 27, 2021, 3 pages.
Wikipedia, published as "Service virtualization" https://en.wikipedia.org/wiki/Service_virtualization, last version of record as of the priority date of Jun. 7, 2018, as retrieved on Aug. 27, 2021, 3 pages.
Wikipedia, published as "Memory virtualization" https://en.wikipedia.org/wiki/Memory_virtualization, last version of record as of the priority date of Jun. 7, 2018, as retrieved on Aug. 27, 2021, 3 pages.
Wikipedia, "Virtual memory" https://en.wikipedia.org/wiki/Virtual_memory, last version of record as published as of the priority date of Jun. 7, 2018, as retrieved on Aug. 27, 2021, 5 pages.
Wikipedia, published as "Storage virtualization" https://en.wikipedia.org/wiki/Storage_virtualization, last version of record as of the priority date of Jun. 7, 2018, as retrieved on Aug. 27, 2021, 7 pages.
Wikipedia, published as "Clustered file system" https://en.wikipedia.org/wiki/Clustered_file_system, last version of record as of the priority date of Jun. 7, 2018, as retrieved on Aug. 27, 2021, 4 pages.
Wikipedia, of the priority "Virtual file system" https://en.wikipedia.org/wiki/Virtual_file_system, last version of record as published as date of Jun. 7, 2018, as retrieved on Aug. 27, 2021, 3 pages.
Wikipedia, "Software defined storage" https://en.wikipedia.org/wiki/Software-defined_storage, last version of record as published as of the priority date of Jun. 7, 2018, as retrieved on Aug. 27, 2021, 3 pages.
Wikipedia, "Virtual disk" https://en.wikipedia.org/wiki/Virtual_disk, last version of record as published as of the priority date of Jun. 7, 2018, as retrieved on Aug. 27, 2021, 1 page.
Wikipedia, "Data virtualization" https://en.wikipedia.org/wiki/Data_virtualization, last version of record as published as of the priority date of Jun. 7, 2018, as retrieved on Aug. 27, 2021, 3 pages.
Wikipedia, "Database virtualization" https://en.wikipedia.org/wiki/Database_virtualization, last version of record as published as of the priority date of Jun. 7, 2018, as retrieved on Aug. 27, 2021, 2 pages.
Wikipedia, "Network virtualization" https://en.wikipedia.org/wiki/Network_virtualization; last version of record as published as of the priority date of Jun. 7, 2018, as retrieved on Aug. 27, 2021, 3 pages.
Wikipedia, "Virtual private network" https://en.wikipedia.org/wiki/Virtual_private_network, last version of record as published as of the priority date of Jun. 7, 2018, as retrieved on Aug. 27, 2021, 6 pages.
Wikipedia, "Memory pool" https://en.wikipedia.org/wiki/Memory_pool, last version of record as published as of the priority date of Jun. 7, 2018, as retrieved on Aug. 27, 2021, 2 pages.
Wikipedia, "Multitenancy" https://en.wikipedia.org/wiki/Multitenancy, last version of record as published as of the priority date of Jun. 7, 2018, as retrieved on Aug. 27, 2021, 3 pages.
Wikipedia, "USB" https://en.wikipedia.org/wiki/USB, last version of record as published as of the priority date of Jun. 7, 2018, as retrieved on Aug. 27, 2021, 18 pages.
Wikipedia, "Thunderbolt (interface)" https://en.wikipedia.org/wiki/Thunderbolt_(interface), last version of record as published as of the priority date of Jun. 7, 2018, as retrieved on Aug. 27, 2021, 10 pages.
Wikipedia, "Serial ATA" https://en.wikipedia.org/wiki/Serial_ATA, last version of record as published as of the priority date of Jun. 7, 2018, as retrieved on Aug. 27, 2021, 17 pages.
Wikipedia, "IEEE 1394" https://en.wikipedia.org/wiki/IEEE_1394, last version of record as published as of the priority date of Jun. 7, 2018, as retrieved on Aug. 27, 2021, 9 pages.
Wikipedia, "SD card" https://en.wikipedia.org/wiki/SD_card, last version of record as published as of the priority date of Jun. 7, 2018, as retrieved on Aug. 27, 2021, 21 pages.
Wikipedia, "MultiMediaCard" https://en.wikipedia.org/wiki/MultiMediaCard, last version of record as published as of the priority date of Jun. 7, 2018, as retrieved on Aug. 27, 2021, 5 pages.
Wikipedia, "USB flash drive" https://en.wikipedia.org/wiki/USB_flash_drive, last version of record as published as of the priority date of Jun. 7, 2018, as retrieved on Aug. 27, 2021,14 pages.
Wikipedia, "Media Transfer Protocol" https://en.wikipedia.org/wiki/Media_Transfer_Protocol, last version of record as published as of the priority date of Jun. 7, 2018, as retrieved on Aug. 27, 20271, 5 pages.
Wikipedia, "USB mass storage device class" https://en.wikipedia.org/wiki/USB_mass_storage_device_class, last version of record as published as of the priority date of Jun. 7, 2018, as retrieved on Aug. 27, 2021, 4 pages.
USB Implementers Forum, "Universal Serial Bus, Mass Storage Class, Specification Overview", Revision 1.4, Feb. 19, 2010, 14 pages.
Linux Kernel 4.17 Sources, Documentation/usb/mass-storage.txt, "Mass Storage Gadget", Jun. 3, 2018, 4 pages.
Linux USB, http://www.linux-usb.org/gadget/file_storage.html, "Backing Storage for the Mass Storage Gadget", Mar. 20, 2013, 3 pages.

\* cited by examiner

DYNAMICALLY-RECONFIGURABLE STORAGE DEVICE

This application is related to U.S. Application No. 62/682,024, titled "Dynamically-Reconfigurable Storage Device", filed on Jun. 7, 2018, the entire contents of which are incorporated herein by reference.

FIELD OF APPLICATION

The present disclosure relates generally to electronic devices and, more particularly, to storage devices.

BACKGROUND

Throughout computing history, information storage and storage media have been a central part of every generation of innovations, continuously evolving as technology and uses-cases changed. At the time of this writing, there are a great deal many options offered to users, each with their pros and cons. While providing a full list of available offerings and their respective benefits and drawbacks is outside the scope of the present disclosure, the present disclosure does cover enhancements made to storage systems and storage devices. Specifically, the present disclosure concerns providing a dynamically-reconfigurable storage device through typically, but not necessarily, locally-connected interfaces such as, but not limited to, USB, Thunderbolt™, eSATA, SDIO and IEEE1394.

Indeed, despite the increasing popularity of online storage systems and file synchronization services, storage devices directly connected to one interface or another of a computing device, such as a USB stick or a USB or Thunderbolt™ hard drive, for instance, remain a pervasive means for transferring, sharing, storing and backing up files. Such connected devices often offer a convenience and transfer speeds unparalleled by other storage options. It's not uncommon, for example, for users to have a stash of USB thumb drives that they use in different circumstances and to continue buying some as spares just in case. As an ad-hoc means of data transfer, directly connected storage devices also offer the benefit of enabling offline data transfers.

Directly connected storage devices' pervasiveness and convenience are, however, offset by a number of limitations. A first limitation is that the number of such storage devices owned by users often make it difficult to track the content of each device. Users then have to resort to connecting devices to their computer to figure out what's on them before using them or sharing them with other users. A further limitation is that anyone who has physical access to such a storage device generally has access to the device's entire content. To avoid sharing possibly sensitive files with someone, people may prefer using a new device instead of an existing one that still has space on it. Even when not intended to be shared with anyone else, such storage devices are often a risky means of storing or backing up data as their loss means that anyone that gets their hand on them can access whatever data is stored, unless some means are used to encrypt the content ahead of time, which few users put in place.

A further issue with sharing directly connected storage devices is the potential of having such a device be infected with malware or viruses once connected to another user's computer or device. Indeed, there have been cases where infected systems have been used to propagated infections by way of copying malicious software onto attached storage devices. There are even cases where the firmware included in and used to operate attached storage devices could be modified, thereby enabling several attack vectors onto future devices to which the hacked storage device is attached to other than just the installation and/or propagation of malicious software. The firmware running on a USB attached thumb drive, for instance, could theoretically be hacked to make the thumb drive act as a USB keyboard and therefore be used to inject input into an unsuspecting computer. The owner of a USB stick that passes it to a friend can therefore have a nasty surprise when they get that storage device back and plug it into their computer.

There is thus a need for a dynamically-reconfigurable storage device that does not readily grant access to its entire content simply by virtue of being connected to a computer or device capable of interfacing with the dynamically-reconfigurable storage device.

There is further thus a need for a dynamically-reconfigurable storage device that allows users to have finner-grained control over which content is visible to computers or devices capable of interfacing with the dynamically-reconfigurable storage device.

There is thus also a need for a dynamically-reconfigurable storage device that enables users to remotely inspect and/or access its content or a description thereof.

There is therefore additionally a need for a dynamically-reconfigurable storage device that is preferably less susceptible to being compromised once passed to another user by its original owner.

SUMMARY OF THE INVENTION

An object of the present disclosure is to provide a dynamically-reconfigurable storage device that overcomes at least one of the previously-listed drawbacks and that satisfies at least one of the above-mentioned needs.

Another object of the present disclosure is to provide a dynamically-reconfigurable storage device that relies on internal or external storage to provide a virtualized storage device to a data store accessing device based on a data access configuration generated separately from the data store accessing device.

According to the present disclosure, there is provided a dynamically-reconfigurable storage device comprising a data store mediator wherein:

the dynamically-reconfigurable storage device further comprises or is connectable to at least one actual data store;

the dynamically-reconfigurable storage device is further connectable to at least one data store access configurator and at least one data store accessing device;

an actual data store comprised in or connected to the dynamically-reconfigurable storage device can be subdivided into at least one virtual data store;

the data store mediator is configured to receive data access configurations from the at least one data store access configurator;

each data access configuration contains a list of at least one virtual data store;

the data store mediator has means for enabling the at least one data store accessing device to access at least one virtual data store; and upon receiving a data access configuration, the data store mediator configures the dynamically-reconfigurable storage device to enable the at least one data store accessing device to access the at least one virtual data store listed in the data access configuration.

According to the present disclosure, there is further provided a method for providing virtual data store access to a multitude of data store accessing devices using a dynamically-reconfigurable storage device, the method comprising the steps of:

connecting or including at least one actual data store to or in the dynamically-reconfigurable storage device;

subdividing the at least one actual data store into at least one virtual data store;

constructing a data access configuration comprising a list of at least one virtual data store using a data store access configurator;

receiving data access configurations from a data store access configurator; and configuring the dynamically-reconfigurable storage device to give at least one data store accessing device access to the at least one virtual data store listed in a data access configuration.

It is hereby noted that for brevity purposes, both the figures used in the present disclosure and the following text use the acronym "DRSD" instead of of "dynamically-reconfigurable storage device". All instances of "DRSD" should therefore be read in context as "dynamically-reconfigurable storage device". For example, "DRSD embodiment" stands for "dynamically-reconfigurable storage device embodiment". Several other acronyms are defined in the present disclosure in a similar fashion as "DRSD" and are to be understood and read following a similar interpretation as just outlined.

A key feature of a DRSD is that it appears to a data store accessing device (DSAD) as a regular locally or directly attached storage device, such as a USB thumb drive, a Thunderbolt hard drive or a similar type of device. Typically, but not necessarily, a DSAD is a device such as a computer, PC or laptop, but it could also be a portable device such as a smartphone or a tablet, as well as a server system or an IoT device. A DSAD can effectively be any device that provides an interface typically used to access what's commonly-referred to as "external storage"; in contrast to "internal storage" which is generally not directly removable without physically disassembling a DSAD. At the time of this writing, such external storage interfaces (ESIes) include, but are not limited to, USB, Thunderbolt™, eSATA, SDIO and IEEE1394. While most of these require a direct electrical connection between the storage device and a DSAD, it's entirely possible to conceive an ESI based on other technologies such as short-range radio frequency (RF), inductive or optical interfaces, or any other established method by the laws of physics to transmit data. A DRSD based on such alternative technologies would still be covered by the teachings of the present disclosure.

Any given ESI may support several device protocols, classes or types of interaction related in some way to data storage. USB, for instance, supports both a "mass storage" and a "media transfer protocol" (MTP) classes for data transfer. The present disclosure covers any and all data storage-related functionality used in conjunction with any given ESI, regardless of the specific examples or technologies used to illustrate various embodiments below.

A DRSD comprises a data store mediator (DSM) connectable to at least one actual data store (ADS) and at least one data store access configurator (DSAC). An ADS may be packaged within a DRSD itself, connected to a DRSD using an ESI or provided remotely over a network connection between a DRSD and a network storage service (NSS). A DSAC may also be packaged partially or completely as part of a DRSD. Preferably, but not necessarily, a DSAC is partially or completely provided by software running remotely from a DRSD, possibly on a smartphone, laptop, server, or a combination thereof. When a DRSD is connected to a DSAD, the DRSD's DSM connects to a DSAC to inform it of the connection and request a data access configuration (DAC). A DAC consists of a list of ADSes, and/or partitions, files, segments or any form of subdivision or subpart of ADSes, to be made visible to a DSAD as a set of virtual data stores (VDSes). When a DAC is received by a DRSD, it is applied by the DSM and/or the relevant system components part of the DRSD, be they electronic, reconfigurable hardware (i.e. something like an FPGA or CPLD), software or otherwise, thereby causing the VDSes selected in the DAC to appear to a DSAD as if they were ADSes directly connected to the DSAD. All other parts of the DRSD's ADSes not part of the DAC provided by the DSAC are therefore invisible and inaccessible to any DSAD.

To provide a DAC, a DSAC typically, but not necessarily, follows access rules and/or choices provided by a user or system administrator. Those rules and choices may be selected ahead of time, automatically generated, dynamically selected, selected interactively, any combination thereof or established using any other known technical means for deriving or inferring similar information. If a DSAC is implemented as an app on a smartphone, for example, the app may display a dialog to the smartphone user upon receiving a DAC request to enable the user to select which VDSes are to be made accessible by the corresponding DRSD to a DSAD. That selection would then be returned by the app to the DSM for applying onto the DRSD. In this way, a DRSD may be packaged or configured with at least one large ADS which can then be configured by its owner to be subdivided into several VDSes as part of its configuration. The configuration and partitioning of a DRSD's ADSes into separate VDSes could be done using a DSAC as part of provisioning and/or pairing the DSAC to the DRSD. A DSAC could also be made to enable VDS modifications, additions and content inspection at any point in time after initial configuration and provisioning. Other DSAC embodiments include, but are not limited to, a desktop application, a web-based service, an app for a wearable device or an addition to a smart assistant such as Amazon Alexa, Google Assistant or Apple Siri.

In one use-case, a DRSD owner, who would likely also have a smartphone, could use their smartphone to select which VDSes are made accessible to a DSAD when the DRSD is connected to it. A DRSD owner could therefore benefit from having a single device with very large storage capacity that they could carry around and share with any other person without fear of that person having access to any other data than that the DRSD owner chooses to make available to them at the time the DRSD is connected to the other person's DSAD.

Given that a DSAD is not typically able to participate in the decision-making of what's in a DAC, it cannot therefore compromise or steal any of the content of any VDSes not exposed to it. If, for example, a person passes their DRSD to a colleague or connects it to a friend's computer and that other person's computer contains malicious software, the only DRSD data that could be compromised or infected would be that the DRSD owner chooses to share with this other person. Furthermore, a DRSD could be configured to run anti-virus or anti-malware software continuously on its VDSes when it's not connected to a DSAD. This way, any issues with data could be caught before the DRSD is connected to another device and possibly remedied as well. Alternatively, a DRSD could be configured to actively monitor write operations on the VDSes to catch any malicious or infected transfers as they occur.

Once a VDS is exposed to a DSAD, the latter can operate it as a regular ADS that would've been attached to the DSAD. The DSAD's operating system (OS), for instance, should be able to recognize a DRSD as a regular ADS and handle it accordingly. On OSes such as Windows, Mac or Linux, for instance, the user could be prompted with a popup as to what they would like to do with the just-attached storage device(s). All regular storage operations would be identical as if it were a real ADS that were attached to the DSAD instead of the DRSD's VDSes. This includes the need for the DSAD user to properly unmount or request ejection of the storage device attached.

Other features of the presently disclosed computing device and method will become apparent from the following detailed description taken in conjunction with the accompanying drawings, which illustrate, by way of example, the presently disclosed electronic device and method.

BRIEF DESCRIPTION OF THE DRAWINGS

A detailed description of preferred embodiments will be given herein below with reference to the following drawings, in which like numbers refer to like elements.

Note that a few diagrams are based on material provided in the public domain at openclipart.org. Note also that Trademarks belong to their respective owners. Trademarks in this document are first-letter capitalized.

DETAILED DESCRIPTION OF THE PREFERRED EMBODIMENTS

Figure 1:
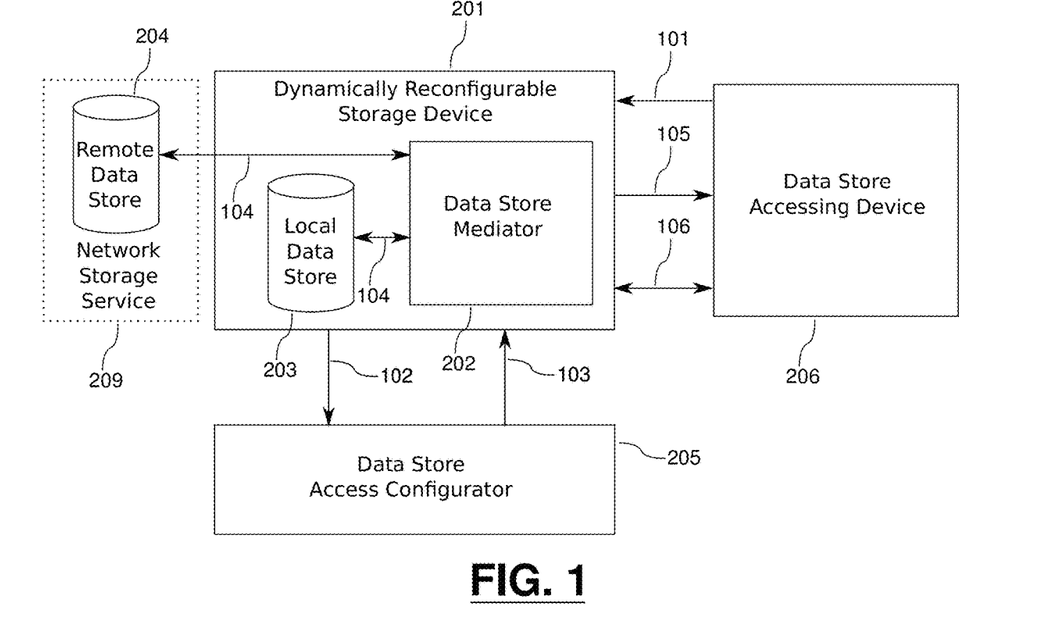
FIG. 1 is one of the embodiments of a dynamically-reconfigurable storage device.

FIG. 1 illustrates one of the preferred embodiments of the present disclosure showing the overall architecture of a DRSD 201 in relation to other components. A DRSD 201 generally comprises a DSM 202 which is connectable to at least one ADS, be it a local data store (LDS) 203 or a remote data store (RDS) 204 provided by an NSS 209. LDSes 203 are typically directly attached to a DRSD 201, either by being built into the DRSD 201 and connected through an internal storage interface (ISI) or connected externally through an ESI. Commonly-used ISIes at the time of this writing include SDIO, PCIe and SATA. Any ISI commonly used in industry, or even a custom ISI, could however be used by a DRSD 201 without departing from the teachings of the present disclosure. RDSes 204 provided by one or several NSSes 209 can be accessed through any of the known remote file access methods including, but not limited to, SMB, NFS, WebDAV, FTP, and SSH, or even a custom protocol. In sum, a DRSD 201 will be considered as having means for accessing at least one ADS, a non-exhaustive list of which was just provided in the present paragraph.

Typically, but not necessarily, when a DSAD 206 is connected 101 to a DRSD 201, the DRSD 201 informs 102 a DSAC 205 that a DSAD 206 has been connected and requests 102 a DAC from the DSAC 205. The DSAC 205 then sends 103 a DAC to the DRSD 201 based on whatever rules or algorithms are chosen at design time for obtaining such information. As mentioned earlier, several possibilities exist for creating DACs including, but not limited to, relying on pre-established rules, dynamically querying a user management system, user interaction, or a combination of methods. The interaction between a DRSD 201 and a DSAC 205 is preferably, but not necessarily, handled by a DSM 202. Optionally, a DSAC 205 can initiate the sending of a DAC to a DRSD 201 without the DRSD 201 having first requested one. Such would be the case where a user wants to dynamically modify the VDSes exposed to a DSAD 206, for example. Whenever a DAC is received, be it an initial one or a new one, a DRSD 201 applies it by making the VDSes specified in the DAC visible 105 to the connected DSAD 206. Once any VDS is visible to a DSAD 206, the DSAD 206 may interact with it 106 as if it were an ADS directly connected to the DSAD 206.

A DSM 202 and a DSAC 205 may interact to list, provision, explore the content of and generally manage the LDSes 203 or RDSes 204 connected to a DRSD 201. Such interaction may occur regardless of whether a DSAD 206 is connected to the DRSD 201. An embodiment could, for instance, enable a DSAC 205 to initiate communication with a DRSD 201 for providing it with a DAC prior to the DRSD 201 being connected to a DSAD 206 for use by the DRSD 201 contemporaneously with its connection to a DSAD 206. This could be useful, for instance, if the user is storing a bootable OS image on a VDS and would like a to-be-connected DSAD 206 to use that image to boot from. If the bootable image in the VDS is an x86-based Linux distribution, for example, then a PC could use that user-selected VDS to boot such a Linux distribution.

All access requests made by a DSAD 206 onto a VDS, including, but not limited to, read, write and file status requests, are redirected 104 by the corresponding DSM 202 to the relevant LDSes 203 or RDSes 204. This redirection may take several forms. Either the DSM 202 itself is a direct intermediary for all access requests, or the DSM 202 is composed of several parts, with only some being involved in some or all transfers, or, yet, the DSM 202 configures other DRSD 201 software or hardware components, or a combination of both or several of each, to handle DSAD 206 requests based on a set of DSM-provided 202 configurations. Such DRSD 201 software components may include, but are not limited to, device drivers, OS abstractions, firmware, and key applications or services. Such DRSD 201 hardware components may include, but are not limited to, programmable logic, such as FPGAs or CPLDs, chip-level registers, switches, controllers, processors, or I/O handlers. A DSM 202 or any of its parts may, therefore, not be involved in every single or any transaction between a DSAD 206 and the VDSes it is accessing. Instead, a DSM 202 will be considered as having means for enabling a DSAD 206 to access VDSes, a non-exhaustive list of which was just provided in the present paragraph.

Figure 2:
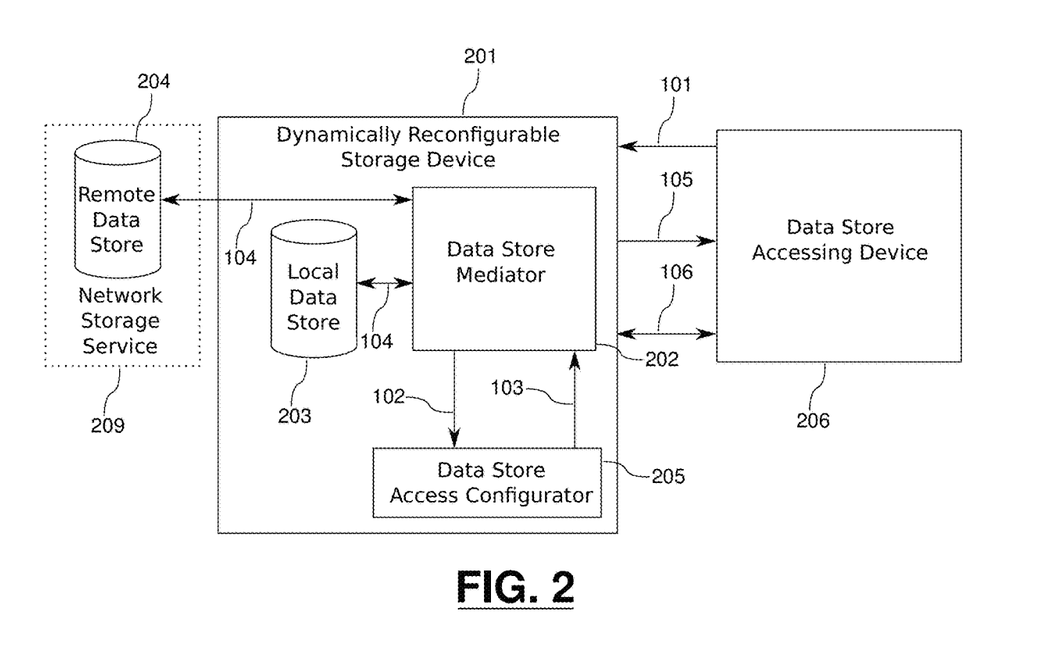
FIG. 2 is an embodiment of a dynamically-reconfigurable storage device with an integrated data store access configurator.

FIG. 2 illustrates another embodiment of the present disclosure where a DSAC 205 is integrated into a DRSD 201. In such a configuration, for instance, the DRSD 201 may have means for presenting a user interface and receiving input from a user. This may be by providing a remote web interface for users to interact with or it may involve having a built-in touch-capable screen allowing the user to directly interact with the DRSD 201, or any combination of commonly-used or custom-built user-interfacing techniques and/or hardware. In another instance, a DSAC 205 in a DRSD 201 may be configured to interface with an external and/or remote rule management system thereby enabling the DSAC 205 to retrieve DACs dynamically, possibly through some sort of network service.

Figure 3:
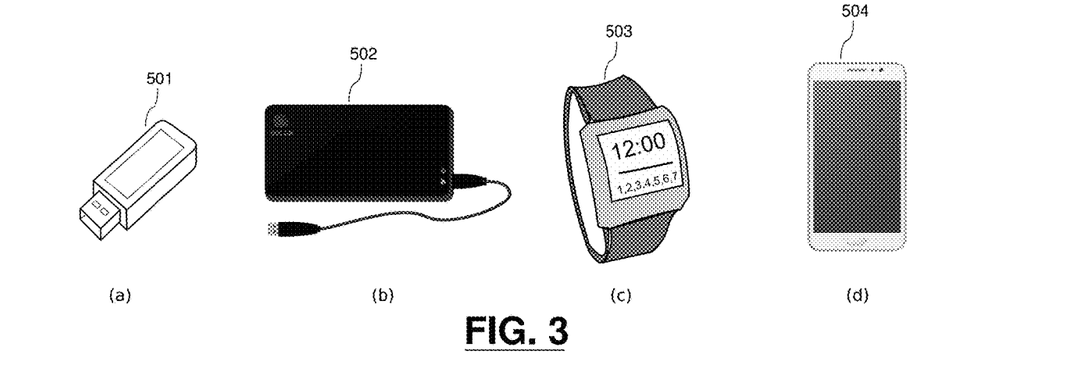
FIG. 3 are a few example form-factor embodiments of a dynamically-reconfigurable storage device.

FIG. 3 illustrates a few possibly form-factor embodiments of a DRSD according to the present disclosure. (a) is a DRSD in the form of what is commonly-referred to as a USB thumb drive or USB stick 501. (b) is a DRSD in the form a what is commonly-referred to as an external USB hard disk or drive 502. Both of these would look to their users as closely-resembling a general-purpose ADS version of such a device, but would include the DRSD functionality described in the present disclosure. Each of these may include additional buttons, LEDs, indicators, LCD screens, buttons, or any other form of input or output to enable the pairing, configuration and operation of such a DRSD by a user and/or in conjunction with an externally-operated DSAC such as an app on a smartphone. One of the benefits of the form-factors (a) and (b) is that they represent known form-factors and functionality to users.

FIG. 3 (c) illustrates a DRSD comprised in a smartwatch or just a general watch 503. In such an embodiment, the watch 503 may have a standard ESI connector directly integrated into it or one accessible via the use of a custom cable, converter, add-on or module that exposes an ESI connector on one side and some custom connector to the watch on the other side. Such a custom connector may be a set of magnetically-latched pogo pins as is commonly used on some smartwatches for charging and connecting to a user's computer. Any industry-standard or custom connector may however be used to connect a DRSD embodied in a watch or smartwatch 503 to a DSAD. The DRSD functionality would be provided in the watch 503 in addition to its existing functionality. If it is a smartwatch 503 with notification and fitness tracking functionality, for instance, the DRSD functionality could be provided in addition to those functionalities and possibly integrated into the existing user interfaces and management capabilities already provided to the user. One of the benefits of the watch or smartwatch form-factor 503 is that it enables the user to carry their DRSD around on their wrist at all times without having to carry any separate storage devices.

In the case of a smartwatch 503, it may be paired to a smartphone using any standard wireless interface, such as, but not limited to, Bluetooth, Wifi or cellular, the smartphone then being used to host a DSAC for operating the smartwatch's DRSD functionality. Alternatively or additionally, the smartwatch may include DSAC functionality for enabling its user to operate and configure its DRSD functionality.

One such smartwatch embodiment 503 may be based on U.S. patent application Ser. No. 16/179,979 filed Nov. 4, 2018 and entitled "Module-Driven Smartwatch" and possibly use the connector system described in U.S. patent application Ser. No. 16/181,192 filed Nov. 5, 2018 and entitled "Watch Module Connector". In reference to said applications, an embodiment may be provided wherein a module-driven smartwatch module may provide an ESI for connecting a DSAD to the module-driven smartwatch such that said module-driven smartwatch could embody or include a DRSD. As such, such a module-driven smartwatch could include an LDS for the purpose of making parts of it available as VDSes to DSADs connected to the module-driven smartwatch. A DSAC integrated as part of an app generally used to interface with a module-driven smartwatch on the module-driven smartwatch owner's smartphone could allow them to control which VDSes are exposed to DSADs once the module-driven smartwatch is connected to one using an ESI-capable module.

FIG. 3 (d) illustrates a DRSD comprised in a smartphone 504. In such an embodiment, whichever existing connector enables the smartphone to connect to a PC can also be used to provide DRSD functionality to a DSAD. While traditionally smartphones may enable their users to share files with their PC using mechanisms such as USB "mass storage" or MTP classes, such functionality does not enable them any sort of control over partitioning the available storage (i.e. effectively the ADS made available by the smartphone for sharing with the device accessing the smartphone's storage over an ESI) into several VDSes as a DRSD is configured to. As such, integrating a DRSD or DRSD functionality into an existing smartphone would enable the user to subdivide available ADS space into several VDSes that the smartphone user may selectively choose to make available in the fashion described above upon the smartphone being connected to a DSAD. Much like before, a DSAC may be integrated into an app or even be built into OS functionality found on the smartphone. In this form of smartphone embodiment, a DSM 202 and a DSAC 205 would be integrated simultaneously in the smartphone as illustrated in FIG. 2 above.

Figure 4:
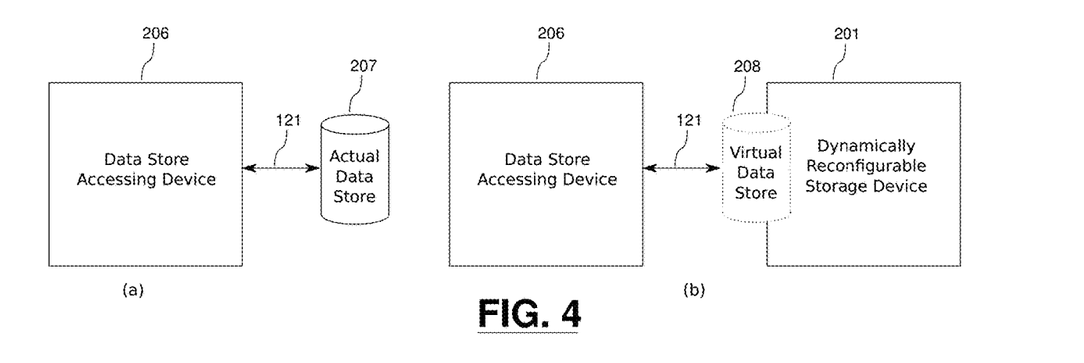
FIG. 4 is an illustration of the data store view as seen by a data store accessing device.

FIG. 4 illustrates the contrast between a DSAD's 206 view of the of its interactions 121 with an ADS 207 versus a VDS 208 provided by a DRSD 201. In essence, from a DSAD's 206 point of view, all interactions are identical. Regardless of the ESI used to connect an ADS 207 or a VDS 208 to a DSAD 206, the DSAD 206 interacts 121 identically with a VDS 208 as it would with an ADS 207. If, for instance, a DSAD 206 supports interacting with ADSes 207 exposed through USB mass storage class then a DRSD 201 exposing a VDS 208 as a USB mass storage device will work in the same way from the DSAD's 206 point of view.

Figure 5:
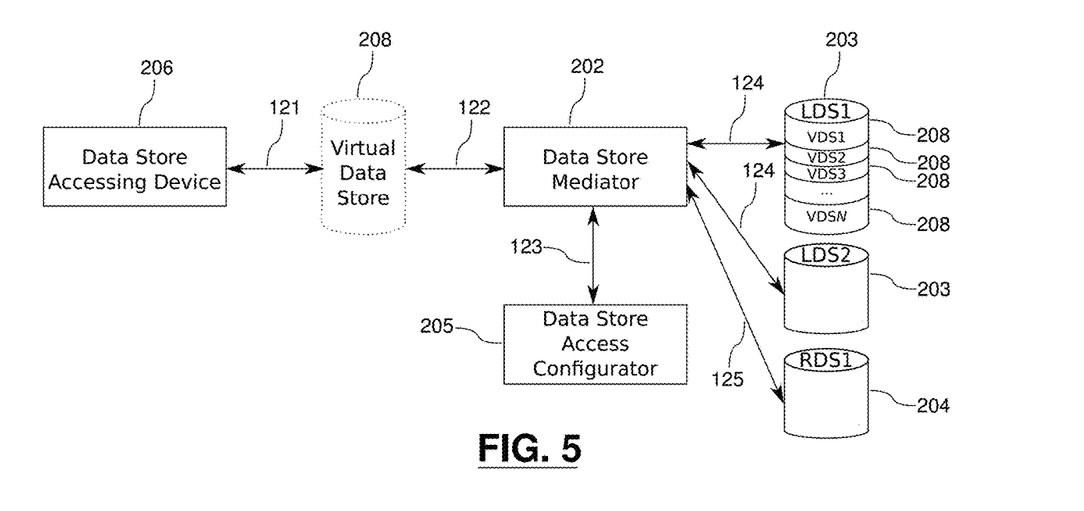
FIG. 5 is a detailed view of an example embodiment of a data store.

FIG. 5 illustrates how a VDS 208 exposed to a DSAD 206 further translates into LDSes 203, RDSes 204 and VDSes 208. As outlined earlier, DSAD 206 interactions 121 are generally, though not necessarily, forwarded 122 to the DSM 202 which then mediates access to local 124 LDSes 203 or remote 125 RDSes 204 based on DACs obtained 123 from a DSAC 205. As mentioned earlier, a DSM 202 does not necessarily need to be a party to all transactions between a DSAD 206 and a VDS 208. Instead, it may simply set up the appropriate configuration for other components (not shown in FIG. 5) in a DRSD 201 to mediate such interactions. Regardless of how DSAD 206 accesses are mediated to VDSes 208 in any specific DRSD 201 embodiment, each LDS 203 and RDS 204 may be subdivided into several VDSes 208, each containing independent filesystems, files and/or data-sets. VDS 208 creation, provisioning and management is preferably, but not necessarily, done through a DSAC 205. A user may for instance, use a DSAC 205, to subdivide an LDS 203 into several VDSes 208, one for each of their personal needs. They could, for instance, have one VDS 208 for each of the following purposes:

Personal picture backup

Work files for project "ABC"

Work files for project "foobar"
Bootable Windows image
Bootable Linux image
Miscellaneous Each VDS 208, be it hosted on an LDS 203 or an RDS 204, may be configured to be backed up automatically by the corresponding DRSD 201 or DSAC 205 to cloud infrastructure. As mentioned earlier, a DRSD 201 may also additionally run anti-virus, anti-malware or any sort of scanning or filtering process on a VDS 208 at any point in time. A DRSD 201 may in fact monitor all VDS 208 accesses based on any sort of criteria or using any known monitoring mechanism. A single VDS 208 may also be made of several parts of LDSes 203 and RDSes 204, or multiple other VDSes 208.

A DSM 202, and possibly the corresponding DSAC 205, may also provide mechanisms and integration with other DRSD 201 components to enable encrypting and securing VDS 208 content. In an example embodiment, a user may use a DSAC 205 to set up a new encrypted VDS 208 on a DRSD 201. Several requirements could therefore be put in place for making this VDS 208 available to a DSAD 206. The user may need, for example, to reenter the encryption/decryption password, or any form of credentials, including biometric ones, through a DSAC 205 in order for the VDS 208 to become accessible to a DSAD 206. Or, possibly, the user may need to enter a password or provide credentials for a DRSD 201 to be able to retrieve the decryption key or keys required for making a VDS 208 accessible to a DSAD 206. Technologies such as ARM™ TrustZone™-backed Trusted Execution Environment or equivalent mechanisms could be leveraged to that effect. Using such techniques, it would be possible to not only secure VDS 208 access by requiring its owner to enter some form of credentials, but also to secure VDSes 208 from brute-force attack if any attempt was made to access the LDSes 203 or RDSes 204 containing them directly while disconnected from their corresponding DRSD 201. Alternatively, or additionally, such security mechanisms may be used strictly for precluding LDSes 203 and/or RDSes 204 to be accessed without the corresponding DRSD 201. Similarly, security mechanisms could be used to ensure the integrity of LDSes 203, RDSes 204 or VDSes 208 to ensure that they were not altered outside the control of their corresponding DRSD 201.

Additional levels of security and conditions may be put in place for making LDSes 203, RDSes 204 or VDSes 208 accessible. Unlocking a VDS 208 may for instance require several layers of approvals. The local user handling a DRSD 201 with a corresponding DSAC 205 may first need to provide their approval but a remote administrator or user management system, such as Kerberos, ActiveDirectory or LDAP-based system, may also need to provide approval as well by providing, for instance, a one-time-use token. Or multiple keys could be used to secure a VDS 208, thereby requiring several users to provide credentials for a VDS 208 to become accessible. Additionally, geolocation may be used to further constrain secure access. A VDS 208 may be configured for example to only be accessible or to not be accessible within a specific geographic location or locations. A DRSD 201 may, therefore, also contain means for identifying its location such as additional hardware for supporting GPS, GLONASS, Galileo, Beidou or any other system generally referred to as Global Navigation Satellite System (GNSS). Part of the encryption/decryption credentials or passwords may also be stored along with a DSAC 205 remotely from a DRSD 201. If a DSAC 205 is implemented as an app on a smartphone remotely from a DRSD 201, then the LDSes 203, RDSes 204 and VDSes 208 accessible to the DRSD 201 may therefore not be accessible without the corresponding DSAC 205. Access may also be time-constrained. A VDS 208 may, for instance, only be accessible within work-hours at a given location. Embodiments could be made where a DRSD 201 carrier may not be able to access any of the VDSes 208 at all. As such, it may be that only individuals or organizations the DRSD 201 carrier is visiting may be able to access VDSes 208 encrypted or secured for them. Any combination of the aforementioned mechanisms and techniques, or other ones still, may also be used to implement security and integrity features into a DRSD 201. In other words, a DRSD 201 will be considered as having means for encrypting and securing access to VDSes 208, a non-exhaustive list of which was just provided in the present and previous paragraphs.

In one likely common case, it is foreseen that a DRSD 201 would be owned and operated by the same person. A user would, for example, buy a DRSD 201, configure it to pair over Bluetooth with their smartphone, install the corresponding DSAC 205 app on their smartphone, and proceed to configure, provision, and use the DRSD 201. Such a user would be carrying their DRSD 201 with them in some way shape or form, and use it when needed. If they were working with a colleague, they could lend their DRSD 201 to the colleague for allowing them to copy files to and/or from a VDS 208 they share with their colleague. It's entirely foreseeable, as was alluded to earlier, that DRSDs 201 may be rolled out by an organization to users and therefore also administered and provisioned by that organization for and/or in conjunction with their users. In such cases, many of the security and approval mechanisms mentioned above would become very useful.

Figure 6:
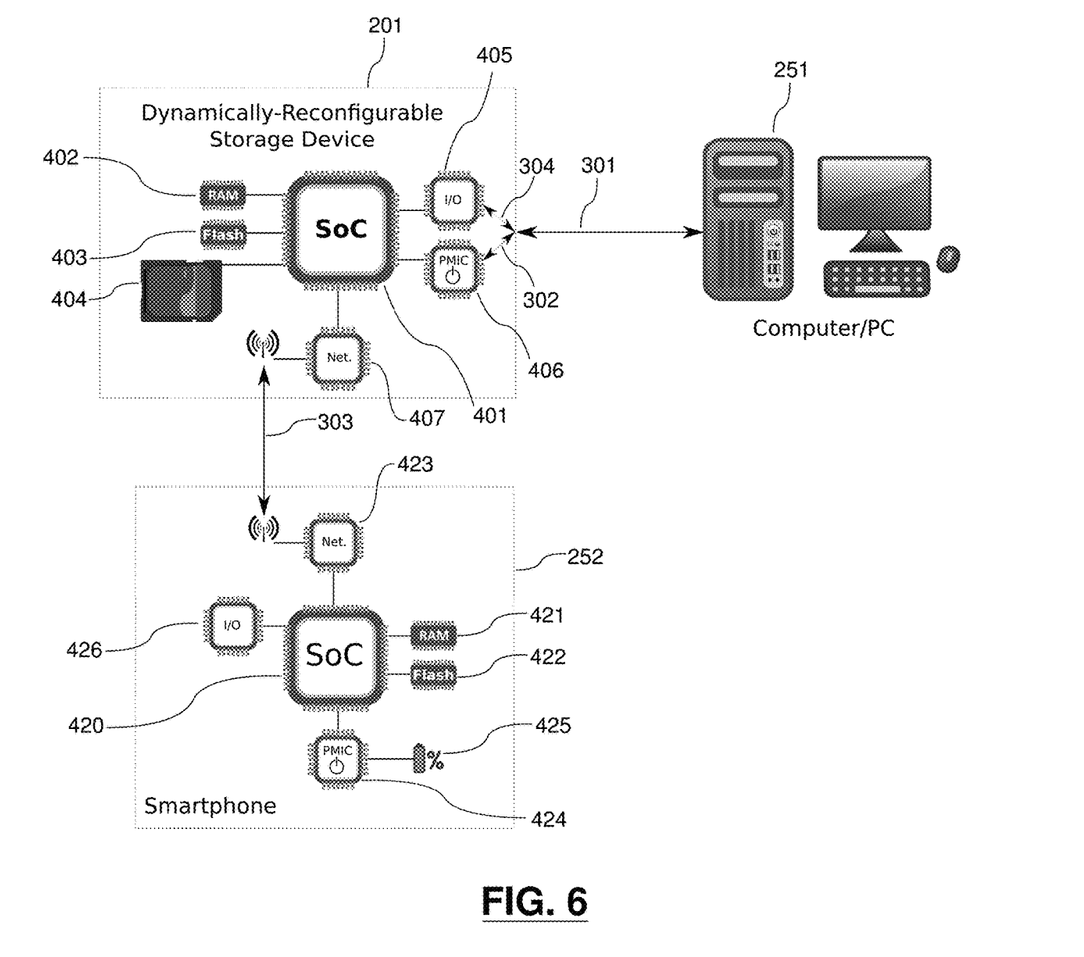
FIG. 6 is one of the embodiments of the hardware of the dynamically-reconfigurable storage device.

FIG. 6 illustrates a detailed view of one of the preferred embodiments of a DRSD 201. A DRSD 201 typically, but not necessarily, comprises a System-on-Chip (SoC) 401 connected to RAM 402 and built-in storage 403 (such as eMMC, raw NOR or NAND flash, an SD card or any other means for persistent storage, including other than flash-based). The SoC is also connected to I/O hardware 405, a power-management IC (PMIC) 406 and networking hardware 407. In this embodiment, an LDS is present as a built-in SD card 404. An eMMC or micro-SD card could also be used instead, or any other storage means as outlined earlier. There may also not be a separate storage device for the LDS within the DRSD 201. Instead, the built-in storage 403 connected to the SoC 401 could also be subdivided or partitioned such that a portion of its available storage is used for LDS purposes.

In this specific configuration, the DRSD 201 is primarily powered by the Computer/PC 251 acting as a DSAD. When the DRSD 201 is connected 301 to the PC 251, the SoC's PMIC 406 receives power 302 and ensures the SoC 401 is powered up properly. The SoC 401 may then proceed with a full OS boot, resume from suspend or start immediately into software implementing a DSM, whichever it is configured for. Once a DSM is operational on the DRSD 201, it communicates 303 with the smartphone 252 matching or paired with the DRSD 201 and obtains a DAC as explained earlier; the smartphone 252 having its own separate SoC 420 connected to RAM 421, Flash, 422, I/O 426, networking hardware 423 and a PMIC 424, which is itself connected to a battery 425. The DSM then interacts with the OS running on the SoC 401 or directly with the SoC hardware to enable the selected VDSes from the built-in SD card 404 to be accessible 304 to the PC 251 through the DRSD's 201 I/O hardware 405. If the DRSD 201 is connected to the PC 251 over USB, for instance, then the DRSD 201 may make the selected VDSes in the DAC appear as USB mass storage devices to the PC 251. The PC 251 can then operate on the VDSes as if they were real USB mass storage devices directly connected to it.

As outlined earlier, an app corresponding to the DRSD 201 is installed on a smartphone 252 to enable the DRSD 201 to retrieve a DAC either by querying the user through a smartphone interface and/or communicating with an authorization/authentication backend to enable access to VDSes.

In the case of a smartwatch 503, it may be paired to a smartphone using any standard wireless interface, such as, but not limited to, Bluetooth, Wifi or cellular, the smartphone then being used to host a DSAC for operating the smartwatch's DRSD functionality. Alternatively or additionally, the smartwatch may include DSAC functionality for enabling its user to operate and configure its DRSD functionality.

Figure 7:
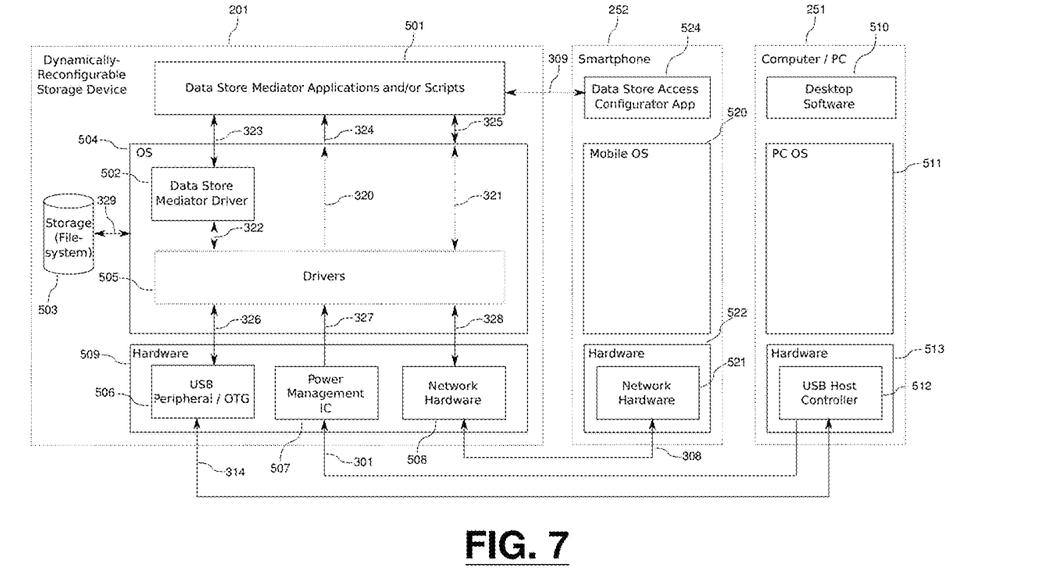
FIG. 7 is an example generic software interaction between the dynamically-reconfigurable storage device, a smartphone and a PC.

FIG. 7 illustrates an example generic software interaction for a DRSD 201 possibly based on the hardware illustrated in FIG. 6. When a PC 251 is connected to the DRSD 201, its USB controller 512 or USB hardware provides power 301 to the DRSD's 201 SoC PMIC 507 (which could be the same as the PMIC 406 seen FIG. 6) part of the DRSD's 201 hardware 509. Whether this triggers the powering of the SoC or whether the DRSD 201 is already powered by a battery and this power connection provides additional power to the existing built-in DRSD 201 battery, the PMIC 507 is capable of providing notice 327 to OS drivers 505 that a PC 251, or some other DSAD, is connected to the DRSD 201. This signal can then be propagated 320 by the OS 504 to 324 DSM applications and/or scripts 501 operating on top of the DRSD 201 OS 504. These DSM applications and/or services 501 would then communicate 309 with a DSAC app 524 on a smartphone 252 by using the appropriate networking APIs 325 provided by the DRSD 201 OS 504, which would then relay calls from the OS' public APIs through the OS software stack 321 to the drivers 505 and from the drivers to 328 the network hardware 508, which itself would use the appropriate hardware mechanisms to communicate 308 with the smartphone's network hardware 521 part of the smartphone's hardware 522. A mobile OS 520 on the smartphone 252 would then be responsible for transferring data between the smartphone's network hardware 521 and the DSAC app 524.

The communication 309 between DSM applications and/or scripts 501 on a DRSD 201 and a DSAC app 524 on a smartphone 252 would result in a DAC to be obtained by the former. The DSM applications and/or scripts 501 would then apply the DAC in part by communicating 323 with a DSM driver 502 found in the DRSD 201 OS 504 which would itself then interface 329 with the storage device 503 connected or included in the DRSD 201, possibly the built-in SD card 404 in FIG. 6, in conjunction with 322 the other drivers 505 in order to expose the VDSes found in the DAC to the PC 251 by way of communicating through 326 the USB peripheral/OTG hardware 506 to 314 the USB host controller 512 part of the PC's hardware 513 and managed by the PC OS 511. As such, desktop software 510 and a PC OS 511 on the PC 251 accesses the DRSD's 201 VDSes as if they were ADSes directly connected to the PC 251.

Figure 8:
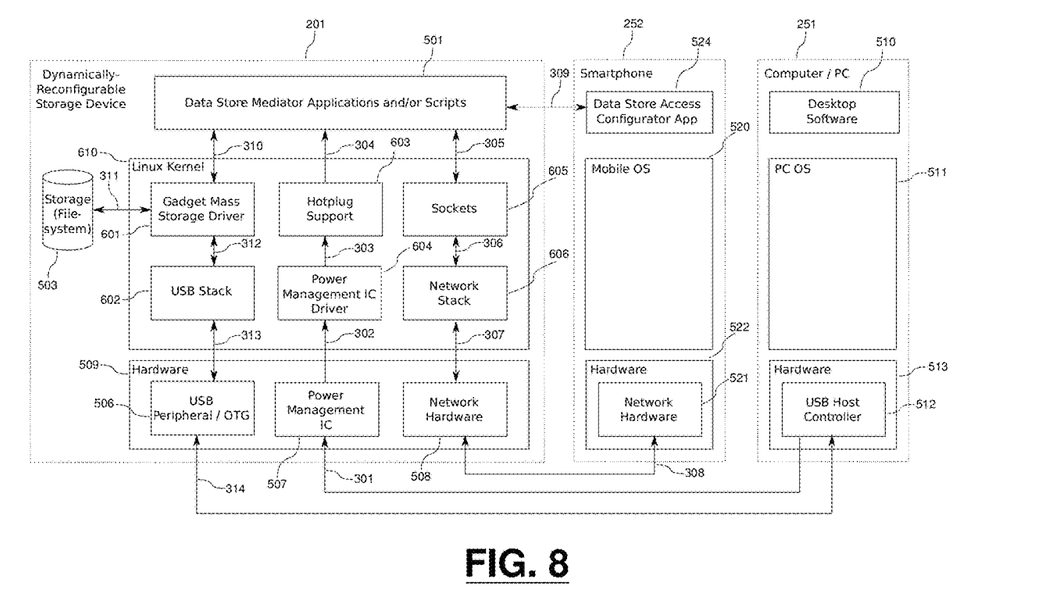
FIG. 8 is an example Linux-based dynamically-reconfigurable storage device and its interaction with a smartphone and a PC.

FIG. 8 illustrates an example software-side interaction for a DRSD 201 based on the Linux OS and the Linux kernel 610 possibly running on the DRSD 201 hardware illustrated in FIG. 6. Whether such a DRSD 201 as in this configuration is self-powered by a battery or whether it is powered by the computer/PC 251 it is connected to, the DRSD's 201 PMIC 507 (also possibly the same PMIC 406 as in FIG. 6), USB peripheral/OTG hardware 506 or some USB host detection circuit identifies that the DRSD 201 is connected 301 to a computer/PC 251. This hardware event is then propagated 302 to the PMIC driver 604 or any other relevant driver before being forwarded 303 to the Linux kernel's hotplug capabilities 603 for sending 304 to the DSM applications and/or scripts 501. The latter initiate communication 309 with a DSAC app 524 running on a smartphone 252 by way of using 305 the Linux kernel's socket APIs 605, which themselves redirect data transfers to and from 306 the kernel's network stack 606, which itself eventually transfers data 307 using the DRSD's 201 network hardware 508 part of the DRSD 201 hardware 509 to and from 308 the smartphone's 252 network hardware 521 part of the smartphone's 252 hardware 522. The smartphone's 252 network hardware 521 then interacts with a mobile OS 520 to convey data between the DRSD 201 and the DSAC app 524. Instead of a DSAD hotplugging event being routed through Linux's hotplug capabilities 603, DSM applications and/or scripts 501 could also use polling of the USB stack 602 to determine if the DRSD 201 is plugged into a DSAD.

Upon receiving a DAC from the DSAC app 524, the DSM applications and/or scripts 501 configure 310 the Linux kernel's 610 USB gadget mass storage driver 601 by providing it the filenames and paths of the VDSes to be exposed to the computer/PC 251. The gadget mass storage driver 601 then interacts 311 with the mounted filesystems 503, which in the case of the system illustrated in FIG. 6 may be provided by a built-in SD card 404, to expose the VDSes to the computer/PC 251. The gadget mass storage driver 601 effectively emulates a USB mass storage device by interacting 312 with Linux's USB stack 602, which itself is configured to interact 313 with the underlying USB peripheral/OTG hardware 506 present in the DRSD 201. The USB peripheral/OTG hardware 506 then interacts 314 with the PC's USB host controller 512 part of the PC's hardware 513 to expose virtual USB mass storage devices, effectively the VDSes provided in the DAC, and enable the PC's OS 511 and desktop software 510 to access those devices as if they were real USB mass storage devices.

Figure 9:
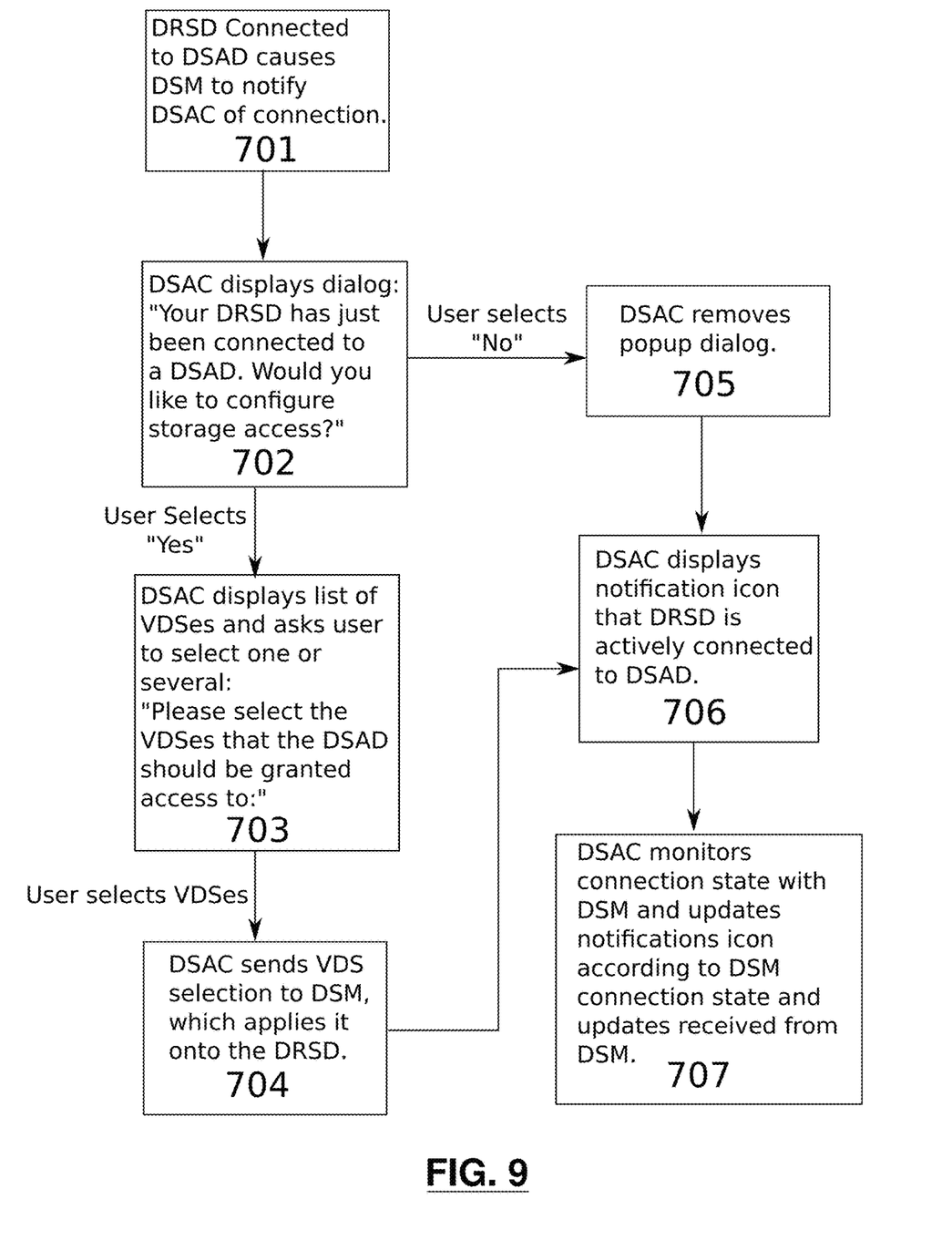
FIG. 9 is an illustration of the data store access configurator user experience upon the attachment of a data store accessing device to a dynamically-reconfigurable storage device.

FIG. 9 illustrates an example DRSD attachment sequence from a DSAC's perspective. Once a DRSD is connected to a DSAD, the DSM in the DRSD notifies a DSAC of the connection 701. The DSAC consequently notifies its user of the connection and asks whether the user would like to configure access to DRSD storage for the DSAD 702. If the user declines 705, the DSAC removes the prompt and/or dialog 705 and possibly proceeds to post some form of visual notification on the device running the DSAC that a DSAD is connected to the DRSD 706. The DSAC then proceeds to monitor any connection change notifications from the DSM and updates status displaying accordingly 707. If instead, the user chooses to configure the storage to be made accessible to the DSAD when they are prompted 703 or if they use the user interface of the device running the DSAC to launch the DSAC's configuration interface, the user is presented with the list of VDSes available on the DRSD to choose from. Once a selection is made, the DSAC sends the list of VDSes to the DSM as a DAC 704, and then proceeds with displaying status information about the DRSD's connection to the DSAD 706 and monitoring the connection status updates between those components 707.

In addition to the previously-mentioned potential capabilities and functionalities of a DSAC, the following list provides a non-exhaustive list of the functionalities that could be included in a DSAC:

Managing initial pairing with DRSD
Manage LDSes and connections to RDSes
Create/delete/resize VDSes
Sync/populate/copy VDSes from or to cloud, PC, smartphone or other DRSDs
Determine/modify VDS partition type, access rights, etc.
View/modify VDS content
View statistics about VDS content, like last update, last write, etc.
View DRSD access logs
Manage encryption/decryption/integrity of LDSes, RDSes, VDSes
Scan VDSes for malware and/or viruses
Manage several DRSDs
Monitor DRSD's battery power state, if DRSD is battery-powered
Update and manage DRSD firmware/OS versions Depending on the ESI being used, it is possible that a DSAD may need a special procedure to properly remove or detach the VDSes attached to it before the corresponding DRSD is disconnected. In the case of USB sticks or USB storage in general, for example, desktop OSes such as Windows, MacOS and Linux require the user to manually request the removal of storage devices given that improper or early disconnection from the corresponding computer may result in data loss or corruption. Since VDSes behave identically as ADSes connected to a DSAD, such improper disconnection which would result in issues for an ADS are likely to also cause issues for a VDS. Contrary to an ADS connected to a DSAD, however, the DRSD may have procedures for handling improper VDS disconnection. This may include, but is not limited to, checking and fixing filesystem integrity, flagging corrupted files, and notifying the DRSD user via a DSAC or otherwise that an abnormal disconnection has occurred.

Several other enhancements are also possible without departing from teachings of the current disclosure. Here are, in no specific order, a list of features, additions or modifications that could be made to a DRSD or its related components:

A DRSD may hold a configuration cache based on the last configuration applied by a DSAC for use, for example, as default for the next DSAD connection or if a DSAC is out of range.

Multiple levels of configuration could be possible with part done on a DRSD, part by a DSAC and part by a network-connected service such as user-provisioning or LDAP.

A supercap may be used to keep a DRSD's SoC powered up sufficiently long enough in case of spurious disconnect from a DSAD to commit any pending VDS transfers.

A DRSD could use one of the USB host identification techniques listed in some research papers to automatically apply a cached configuration based on the host it is connected to. Such techniques would be needed in the case of USB as the USB standard does not provide a way for USB devices to retrieve an ID or set of IDs to identify the USB host they are connected to.

It may be desirable to implement a keepalive signal between a DSAC and a DSM to know if the corresponding DRSD is still connected to a DSAD or if the DRSD is still on. This could possibly be taken care of by the network protocol used to connect the DSAC and the DSM. Still, a DSAC application might need to show a different status based on the DRSD state.

A DRSD could be made to monitor and log all accesses to VDSes in a log for review by the DRSD owner.

A DRSD could report back in real-time to a DSAC, or another component, as to the accesses done by a DSAD on VDSes.

A DRSD could support having several DSADs connected to it simultaneously, each possibly having a different DAC, either redundantly or working in conjunction to each other.

Organizations may provide DRSDs to users for them to boot from when operating DSADs. An organization may have a pool of PCs, for example, with each user booting and runing from their own OS image from their DRSD.

A DRSD could be configured to lock up if its corresponding DSAC is out of range.

It will be understood that numerous modifications and changes in form and detail may be made to the embodiments of the presently disclosed electronic device and method. It is contemplated that numerous other configurations of the electronic device and method may be used, and the modules of the electronic device and method may be selected from numerous modules other than those specifically disclosed. Therefore, the above description should not be construed as limiting the disclosed electronic device and method, but merely as exemplification of the various embodiments thereof. Those skilled in the art will envisioned numerous modifications within the scope of the present disclosure.

What is claimed is:

1. A dynamically-reconfigurable storage device comprising a data store mediator wherein:
   the dynamically-reconfigurable storage device further comprises or is connectable to at least one actual data store;
   the dynamically-reconfigurable storage device is further connectable to at least one data store access configurator and at least one data store accessing device;
   an actual data store comprised in or connected to the dynamically-reconfigurable storage device can be subdivided into at least one virtual data store;
   the data store mediator is configured to receive data access configurations from the at least one data store access configurator;
   each data access configuration is generated substantially separately from the at least one data store accessing device and contains a list of at least one virtual data store;
   the data store mediator has means for enabling the at least one data store accessing device to access at least one virtual data store; and
   upon receiving a data access configuration, the data store mediator configures the dynamically-reconfigurable storage device to enable the at least one data store accessing device to access the at least one virtual data store listed in the data access configuration.

2. The dynamically-reconfigurable storage device of claim 1 wherein:
   the data store mediator is configured to request a data access configuration from the at least one data store access configurator whenever the at least one data store accessing device is connected to the dynamically-reconfigurable storage device.

3. The dynamically-reconfigurable storage device of claim 2 wherein:
   the at least one data store access configurator is implemented as an app on a smartphone.

4. The dynamically-reconfigurable storage device of claim 3 wherein:
the dynamically-reconfigurable storage device is configured to be powered through its connection with the at least one data store accessing device.

5. The dynamically-reconfigurable storage device of claim 4 wherein:
the data store mediator provides virtual data store access to the at least one data store accessing device by way of configuring an operating system running on the dynamically-reconfigurable storage device.

6. The dynamically-reconfigurable storage device of claim 2 wherein:
the at least one data store access configurator is implemented as one of an app on a smartphone, a service hosted on a server, a desktop application, an extension to a smart assistant, an app on a wearable or a combination thereof.

7. The dynamically-reconfigurable storage device of claim 2 wherein:
the data store access configurator can interact with the data store mediator to manage, access or modify the content of the at least one virtual data store stored in the at least one actual data store.

8. The dynamically-reconfigurable storage device of claim 1 wherein:
the dynamically-reconfigurable storage device has means for encrypting and securing access to at least one virtual data store.

9. The dynamically-reconfigurable storage device of claim 1 wherein:
the dynamically-reconfigurable storage device further comprises a data store access configurator.

10. The dynamically-reconfigurable storage device of claim 1 wherein:
the at least one actual data store is one of at least one local data store, at least one remote data store, or at least one of each.

11. The dynamically-reconfigurable storage device of claim 1 wherein:
the data store mediator is implemented as a combination of several software modules, several hardware modules or several modules of both software and hardware.

12. The dynamically-reconfigurable storage device of claim 1 wherein:
the dynamically-reconfigurable storage device is connectable to the at least one data store accessing device using one of USB, Thunderbolt, eSATA, SDIO or IEEE1394.

13. The dynamically-reconfigurable storage device of claim 1 wherein;
the dynamically-reconfigurable storage device is implemented within a smartwatch.

14. A dynamically-reconfigurable storage device comprising a data store mediator and means for accessing at least one actual data store wherein:
the dynamically-reconfigurable storage device is further connectable to at least one data store access configurator and at least one data store accessing device;
the at least one actual data store can be subdivided into at least one virtual data store;
the data store mediator is configured to receive data access configurations from the at least one data store access configurator;
each data access configuration is generated substantially separately from the at least one data store accessing device and contains a list of at least one virtual data store;
the data store mediator has means for enabling the at least one data store accessing device to access at least one virtual data store; and
upon receiving a data access configuration, the data store mediator configures the dynamically-reconfigurable storage device to enable the at least one data store accessing device to access the at least one virtual data store listed in the data access configuration.

15. A dynamically-reconfigurable storage device comprising:
at least one processor;
at least one hardware memory device;
at least one storage device;
at least one networking hardware;
at least one external storage interface;
a data store mediator operating using the at least one processor, the at least one hardware memory device and the at least one storage device; and
wherein:
the dynamically-reconfigurable storage device further comprises or is connectable to at least one actual data store;
the dynamically-reconfigurable storage device is further connectable to at least one data store access configurator by way of the at least one networking hardware;
the dynamically-reconfigurable storage device is further connectable to at least one data store accessing device using the at least one external storage interface;
an actual data store comprised in or connected to the dynamically-reconfigurable storage device can be subdivided into at least one virtual data store;
the data store mediator is configured to receive data access configurations from the at least one data store access configurator;
each data access configuration is generated substantially separately from the at least one data store accessing device and contains a list of at least one virtual data store;
the data store mediator has means for enabling the at least one data store accessing device to access at least one virtual data store; and
upon receiving a data access configuration, the data store mediator configures the dynamically-reconfigurable storage device to enable the at least one data store accessing device to access the at least one virtual data store listed in the data access configuration.

16. A method for providing virtual data store access to a multitude of data store accessing devices using a dynamically-reconfigurable storage device, the method comprising the steps of:
Connecting or including at least one actual data store to or in the dynamically-reconfigurable storage device;
Subdividing the at least one actual data store into at least one virtual data store;
Constructing a data access configuration comprising a list of at least one virtual data store using a data store access configurator substantially separately from an at least one data store accessing device;
Receiving data access configurations from a data store access configurator; and
Configuring the dynamically-reconfigurable storage device to give the at least one data store accessing device access to the at least one virtual data store listed in a data access configuration.

\* \* \* \* \*